United States Patent
Reynolds et al.

(10) Patent No.: US 7,797,096 B2
(45) Date of Patent: Sep. 14, 2010

(54) TORQUE ESTIMATION OF ENGINE DRIVEN GENERATOR

(75) Inventors: Michael G. Reynolds, Troy, MI (US); Chandra S. Namuduri, Troy, MI (US); Toufic M Hijazi, Troy, MI (US); Scott J. Chynoweth, Fenton, MI (US); Michael Livshiz, Ann Arbor, MI (US)

(73) Assignee: GM Global Technology Operations, Inc.

( * ) Notice: Subject to any disclaimer, the term of this patent is extended or adjusted under 35 U.S.C. 154(b) by 682 days.

(21) Appl. No.: 11/468,830

(22) Filed: Aug. 31, 2006

(65) Prior Publication Data
US 2008/0054646 A1    Mar. 6, 2008

(51) Int. Cl.
F02N 11/06    (2006.01)
H02P 9/04    (2006.01)
(52) U.S. Cl. .................. 701/101; 123/350; 290/40 R
(58) Field of Classification Search ............ 290/40 B, 290/40 C, 40 R; 123/319, 339, 179.13, 350; 701/101, 102
See application file for complete search history.

(56) References Cited

U.S. PATENT DOCUMENTS

| | | | |
|---|---|---|---|
| 6,184,661 B1 | 2/2001 | Becker et al. | |
| 6,215,198 B1 * | 4/2001 | Inada et al. | 290/40 C |
| 6,453,222 B1 * | 9/2002 | Lasson et al. | 701/22 |
| 7,010,400 B2 * | 3/2006 | Hisada et al. | 701/22 |
| 7,340,330 B2 * | 3/2008 | Okoshi et al. | 701/22 |
| 2004/0070270 A1 * | 4/2004 | Gunji | 303/152 |
| 2006/0043736 A1 * | 3/2006 | Sriram | 290/37 R |
| 2006/0043939 A1 * | 3/2006 | Namuduri et al. | 322/23 |
| 2006/0237250 A1 * | 10/2006 | Kowatari et al. | 180/242 |
| 2008/0255716 A1 * | 10/2008 | Bandai et al. | 701/22 |
| 2009/0018733 A1 * | 1/2009 | Livshiz et al. | 701/54 |
| 2009/0118966 A1 * | 5/2009 | Livshiz et al. | 701/102 |
| 2010/0087994 A1 * | 4/2010 | Bai | 701/54 |

FOREIGN PATENT DOCUMENTS

| | | | |
|---|---|---|---|
| JP | 11018210 A | * | 1/1999 |
| JP | 2000270408 A | | 9/2000 |

* cited by examiner

*Primary Examiner*—Julio Gonzalez

(57) ABSTRACT

An engine control system for an engine that drives a generator includes a temperature sensor that generates a temperature signal and a control module that determines a generator torque based on an engine speed and a generator characteristic. The control module determines a torque correction factor based on the temperature signal and determines a corrected generator torque based on the generator torque and the torque correction factor. Various embodiments of the invention utilize engine speed, system voltages field winding duty cycle engine temperature, ambient temperature and/or generator current.

10 Claims, 10 Drawing Sheets

TORQUE ESTIMATION OF ENGINE DRIVEN GENERATOR

FIELD OF THE INVENTION

The present invention relates to vehicles, and more particularly to estimating a torque of an engine-driven generator,

BACKGROUND OF THE INVENTION

Internal combustion (IC) engines generate torque by combusting a fuel and air mixture. The torque not only provides propulsion force to the wheels but also drives auxiliary engine loads. For example, the torque is used to drive loads including, but not limited to, an A/C compressor, a generator or alternator, a coolant pump, an oil pump and the like. In the event of an unanticipated load increase, the engine speed decreases and the engine may stall.

To prevent engine stall, engine control systems of spark ignited IC engines maintain a torque reserve by regulating spark timing to a less than optimal amount. Because this spark advance is sub-optimal for a given fuel/air rate, the engine produces less torque than at the optimal timing (i.e. minimum spark for best torque (MBT)). If additional torque is quickly needed to drive an increased load (i.e., faster than the A/F ratio can be changed), the spark timing is advanced closer to optimal to produce additional torque for the same air/fuel rate. Likewise, if less torque is needed, spark timing is retarded further from MBT. This method, however, results in the engine generally running at sub-optimal spark timing to maintain the desired torque reserve, Another method of preventing engine stall is to regulate the engine load. For example, the load (i.e., torque) of the generator can be regulated for idle speed control. In this manner, the engine control system can maintain the spark timing closer to MBT to reduce fuel consumption at idle. Reducing the generator load achieves the same result as increasing engine torque by advancing spark. Tight control the amount of torque load added or subtracted by the generator is required in order to achieve a combination of smooth (i.e. driver transparent) control and improved fuel consumption. However, traditional methods of estimating generator torque are not sufficiently accurate to provide the tight control required. For example, traditional methods of estimating generator torque, when reflected to the engine, can have an error of approximately +/−20 Nm.

SUMMARY OF THE INVENTION

Accordingly, the present invention pertains to methods of accurately estimating the torque of a generator, and is used as part of an engine control system for an engine that drives a generator. The engine control system includes a temperature sensor that generates a temperature signal and a control module that determines a generator torque based on an engine speed and a generator characteristic. The control module determines a torque correction factor based on the temperature signal and determines a corrected generator torque based on the generator torque and the torque correction factor.

In one feature: the generator characteristic includes a duty cycle of a field winding of the generator.

In other features, the generator characteristic includes a field winding voltage of the generator. The field winding voltage is determined based on a system voltage and a field winding duty cycle of the generator.

In still another feature, the control module calculates the corrected generator torque based on system voltage, generator current and speed.

Further areas of applicability of the present invention will become apparent from the detailed description provided hereinafter. It should be understood that the detailed description and specific examples:, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
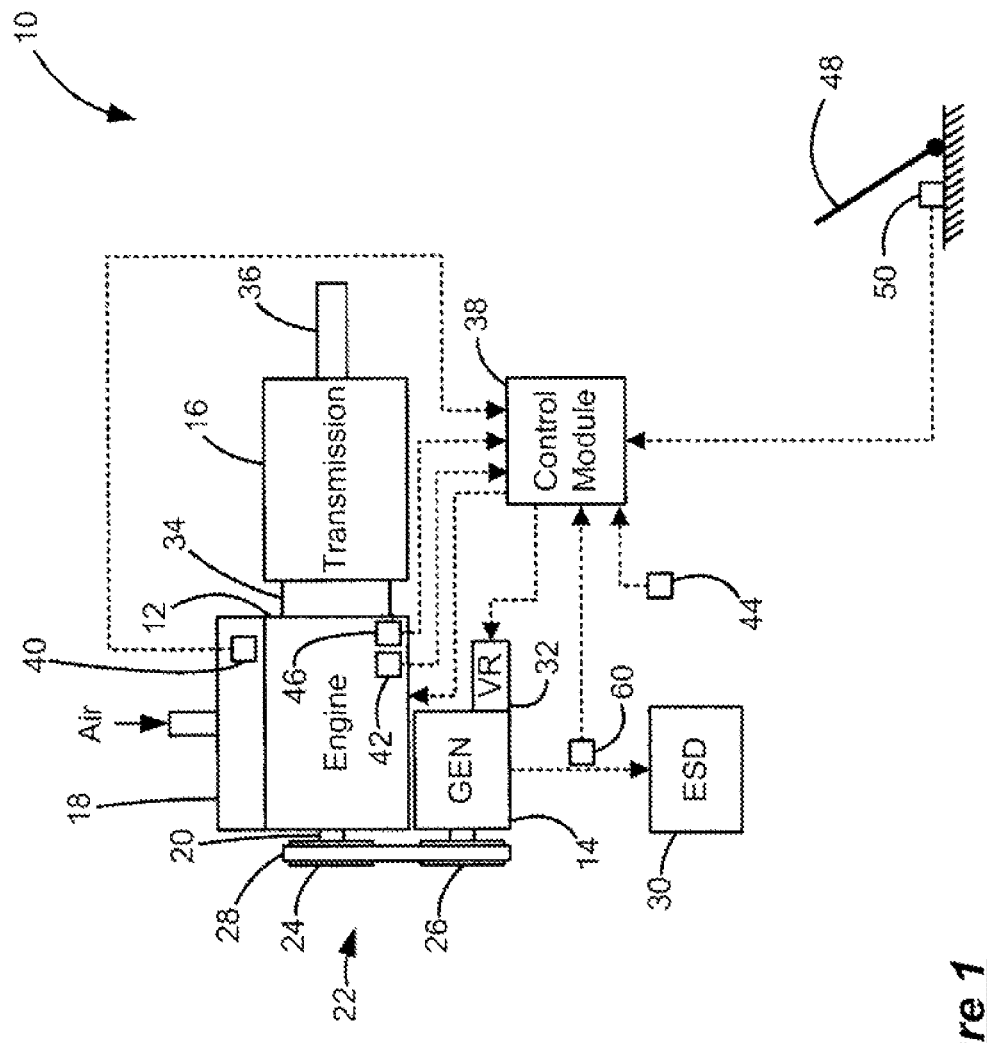
FIG. 1 is a schematic illustration of an exemplary vehicle that is operated based on the generator torque estimation system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle 10 includes an engine 12 a generator 14 and a transmission 16. The engine 12 produces drive torque to drive the generator 14 and the transmission 16. More specifically, the engine 12 draws air into an intake manifold 18 that distributes the air to a cylinder (not shown) where it is combined with fuel to form an air/fuel mixture. The air/fuel mixture is combusted to drive a piston (not shown) within the cylinder, thereby driving a crankshaft 20 to generate drive torque. The combustion process is initiated be a spark generated by a spark plug (not shown). The timing of the spark, relative to the position of the cylinder within the piston: can be adjusted (i.e. retarded or advanced) to regulate exhaust temperature, engine torque and manifold absolute pressure (MAP).

The engine 12 and the alternator 14 are coupled via a belt system 22. The engine 12 and the generator 14 include pulleys 24,26, respectively, that are coupled for rotation by a belt 28. The pulley 24 is coupled for rotation with the crankshaft 20 of the engine 12. The engine 12 drives the generator 14 to generate power used by vehicle systems and/or to recharge an energy storage device (ESD) 30. The generator 14 includes a variable load on the engine 12 ($T_{GEN}$) that is regulated by a voltage regulator (VR) 32. When more electrical energy is required from the generator 145 the VR 32 increases $T_{GEN}$, thereby increasing the amount of engine work. When less electrical energy is required from the generator 14, the VR 32 decreases $T_{GEN}$, thereby decreasing the amount of engine work. During normal engine operation, $T_{GEN}$ is regulated based on a standard load control strategy. An exemplary load control strategy is disclosed in commonly assigned U.S. Pat. Pub. No. US2004/0150375, the disclosure of which is expressly incorporated herein by reference.

The transmission 16 can include, but is not limited to, a manual transmission, an automatic transmission, a continuously variable transmission (CVT) and/or an automated manual transmission (AMT). Drive torque is transferred from the engine crankshaft 20 to the transmission 16 through a coupling device 34. The coupling device 34 can include, but is not limited to a friction clutch or a torque converter depending upon the type of transmission implemented. The transmission 16 multiplies the drive torque through one of a plurality of gear ratios to drive a driveshaft 36.

A control module 38 regulates operation of the vehicle 10 based on the generator torque estimation system of the present invention. The control module 38 controls engine air flow, fuel injection, spark and alternator load to regulate engine torque output. A manifold absolute pressure (MAP) sensor 40 is responsive to the MAP within the intake manifold 18 and generates a MAP signal based thereon. An engine temperature sensor 42 is responsive to an engine temperature and generates an engine temperature signal based thereon. It is anticipated that the engine temperature can be determined from a coolant temperature and/or an oil temperature of the engine 12. An ambient temperature sensor 44 is responsive to an ambient temperature and generates an ambient temperature signal based thereon. It is anticipated that the engine temperature can be further determined based on the ambient temperature. A speed sensor 46 is responsive to the rotational speed (RPM) of the engine 12 and generates a speed signal based thereon. An accelerator pedal 48 is a pedal position sensor 50 is sensitive to a position of the accelerator pedal 48. The pedal position sensor 50 generates a pedal position signal based thereon.

Figure 2:
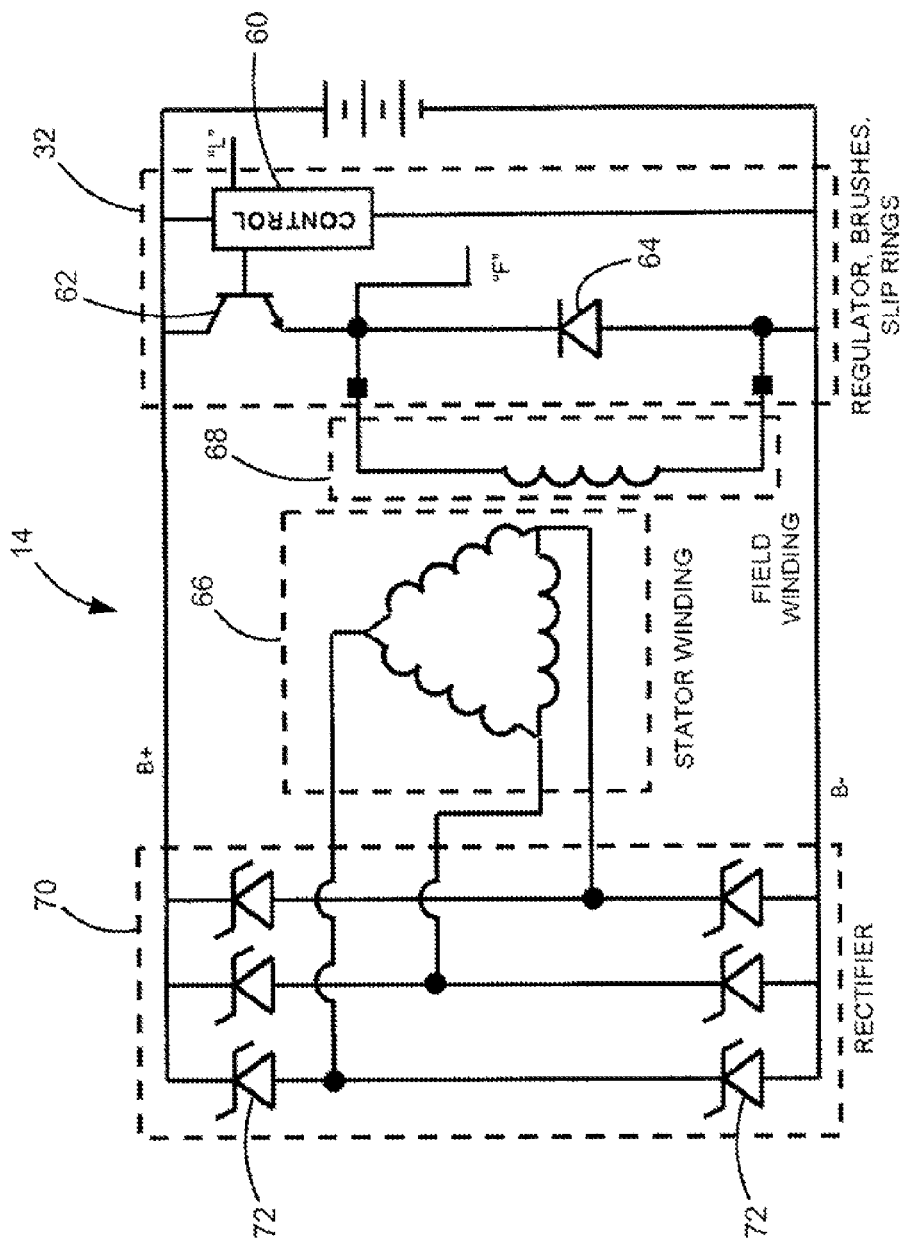
FIG. 2 is an electrical schematic of an exemplary generator.

Referring now to FIG. 2, an exemplary electrical schematic of the generator 14 and voltage regulator 32 are illustrated. The voltage regulator includes a control module 60, a transistor 62 and a diode 64. The generator 14 includes a stator having a stator winding 66, a rotor having claw pole halves (not illustrated) and a field winding 68 and a rectifier 70 having diodes 72. Although not illustrated the field windings are enclosed in first and second claw pole halves, each of which includes a plurality of interleaved tines (e.g., 6 tines per claw pole half). The rotor is rotatably supported within the stator and is rotatably driven by the crankshaft 20.

The voltage regulator 32 is connected to B+ and B− terminals for both power and voltage sensing. The control module 60 senses the voltage at B+. If the voltage is too low compared to an internal reference voltage ($V_{REF}$). The transistor 62 is turned on to apply a voltage to The field winding 68, increasing its current. When the transistor is on, the "F" terminal is approximately 0.8V less than the voltage of B+. When the control module 60 senses that the voltage at B+ is higher than $V_{REF}$, the transistor 62 is turned off. The current that is flowing in the field winding circulates through the diode 64 and slowly decreases. When the transistor is off and the diode 64 is on, the "F" terminal is approximately 0.8 V less than the voltage at B−. The ratio of the time period during which the transistor 62 is on ($t_{ON}$) to the sum of $t_{ON}$ and the time period during which the transistor 62 is Off ($t_{OFF}$) is equal to the duty cycle (DC) of the coil.

The current in the field winding 68 magnetizes the claw pole halves of the rotor. The first claw pole half is magnetized to a north pole (N), and the second claw pole half is magnetized to a south pole (S). The interleaved tines of the claw pole halves is such that when the rotor is assembled, alternating N and S poles are provided circumferentially around the rotor. As the rotor rotates within the stator, a magnetic flux produced by these poles induces an AC voltage in the windings. In the case of 6 tines per claw pole half, the stator winding 66 produces 6 AC voltage cycles per rotor revolution. The magnitude of the AC voltage cycle is proportional to the frequency (i.e., speed of the rotor) and the amount of magnetic flux produced by the field winding 68. The more current in the field winding 68, the more magnetic flux produced by the claw pole halves. At low field winding current, the relationship is nearly proportional.

The diodes 72 of the rectifier 70 are arranged in a manner to efficiently convert the AC voltage produced in the stator winding 66 into DC voltage and current. However, the voltage produced in the stator winding 66 has to be sufficiently large for the diodes 72 to become forward biased. For example if the battery voltage is 12.6V, it takes about 14.6 volts to begin to forward bias the diodes 72 and to produce current.

Figure 3:
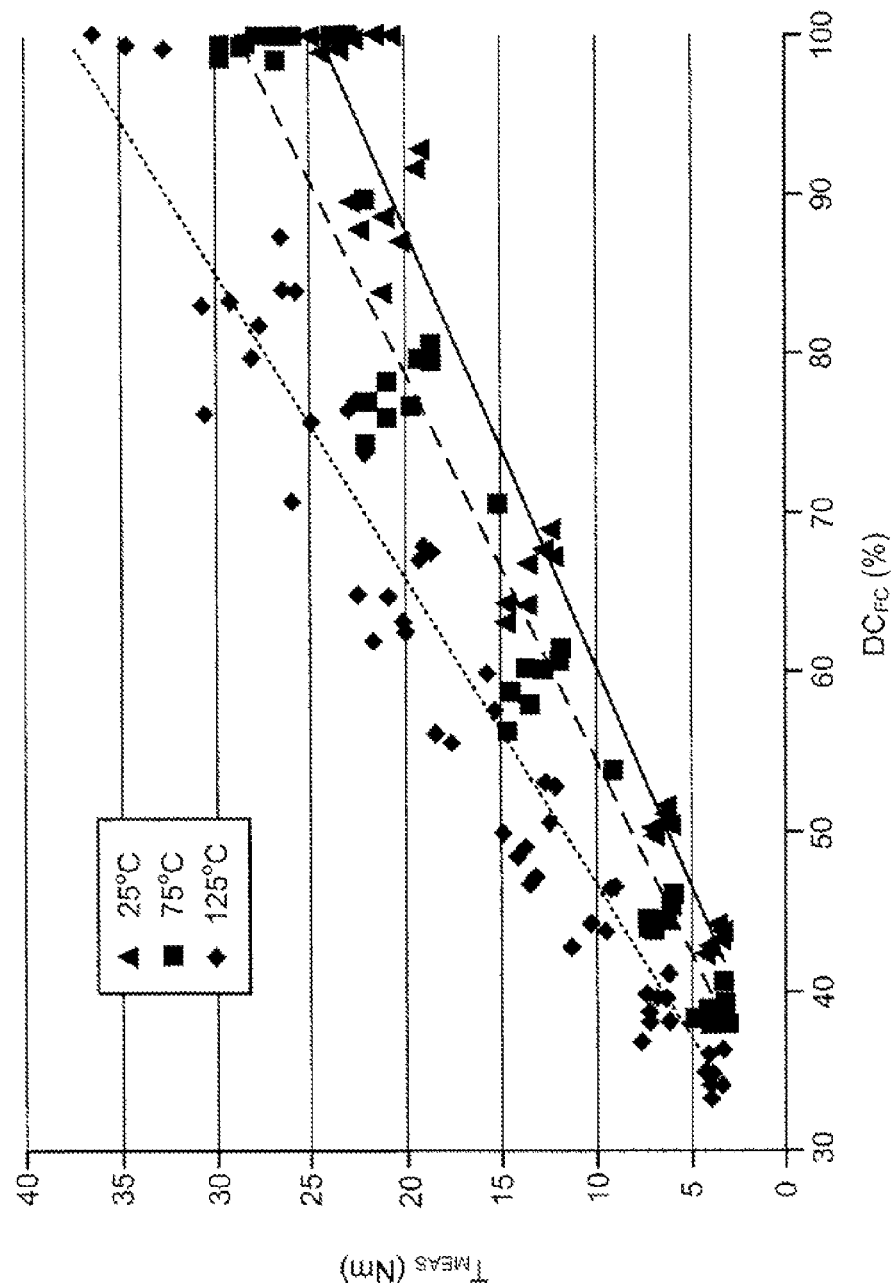
FIG. 3 is a graph illustrating exemplary data points of crankshaft torque versus field coil duty cycle for multiple operating temperatures.

The generator torque estimation system determines a temperature-corrected torque $T_{GEN}$ ($T_{GENCORR}$) based on a duty cycle applied to the field coil ($DC_{FC}$), engine speed (RPM) and engine temperature ($TEMP_{ENG}$). With reference to FIG. 3, exemplary data points were collected for $DC_{FC}$ versus $T_{MEAS}$ (i.e., the measured torque load on the crankshaft to drive the generator) at engine idle (e.g., 1800 generator RPM) for multiple ambient temperatures (e.g., 25° C. 75° C. and 125° C.). Best fit curves are provided for each temperature data set. A multi-dimensional look-up table is implemented to determine the best fit value of $T_{GEN}$ based on engine RPM and $DC_{FC}$. A torque correction look-up table is derived based on the temperature data sets and best fit curves. More specifically, a torque correction factor ($T_{CORR}$) is determined from the look-up table based on $TEMP_{ENG}$. $TEMP_{ENG}$ is determined based on the coolant temperature, the oil temperature and/or the ambient temperature. A corrected generator torque ($T_{GENCORR}$) is determined based on $T_{GEN}$ and $T_{CORR}$.

Figure 4:
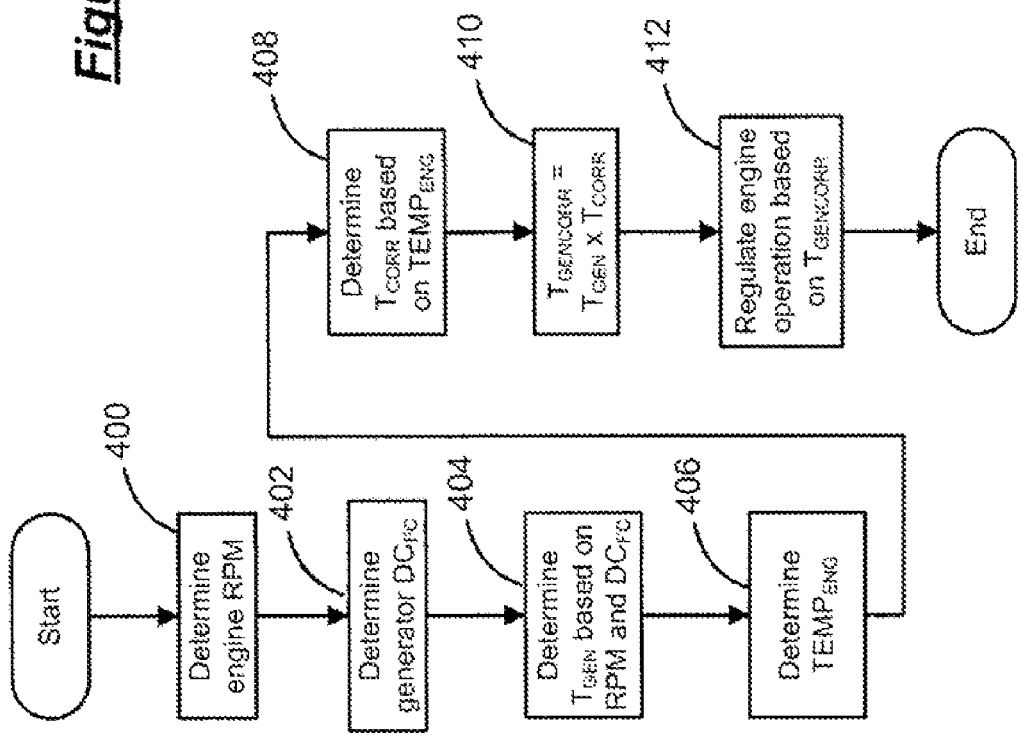
FIG. 4 is a flowchart illustrating exemplary steps executed by a generator torque control according to the present invention.

Referring now to FIG. 4, exemplary steps executed by a generator torque control will be discussed in detail. In step 400, control determines the engine RPM and in step 402, control determines $DC_{FC}$. Control determines $T_{GEN}$ based on RPM and $DC_{FC}$ in step 404. In step 406, control determines $TEMP_{ENG}$. Control determines $T_{CORR}$ based on $TEMP_{ENG}$ in step 408. In step 410: control calculates $T_{GENCORR}$ as the product of $T_{GEN}$ and $T_{CORR}$. In step 412, control regulates operation of the engine based on $T_{GENCORR}$.

Figure 5:
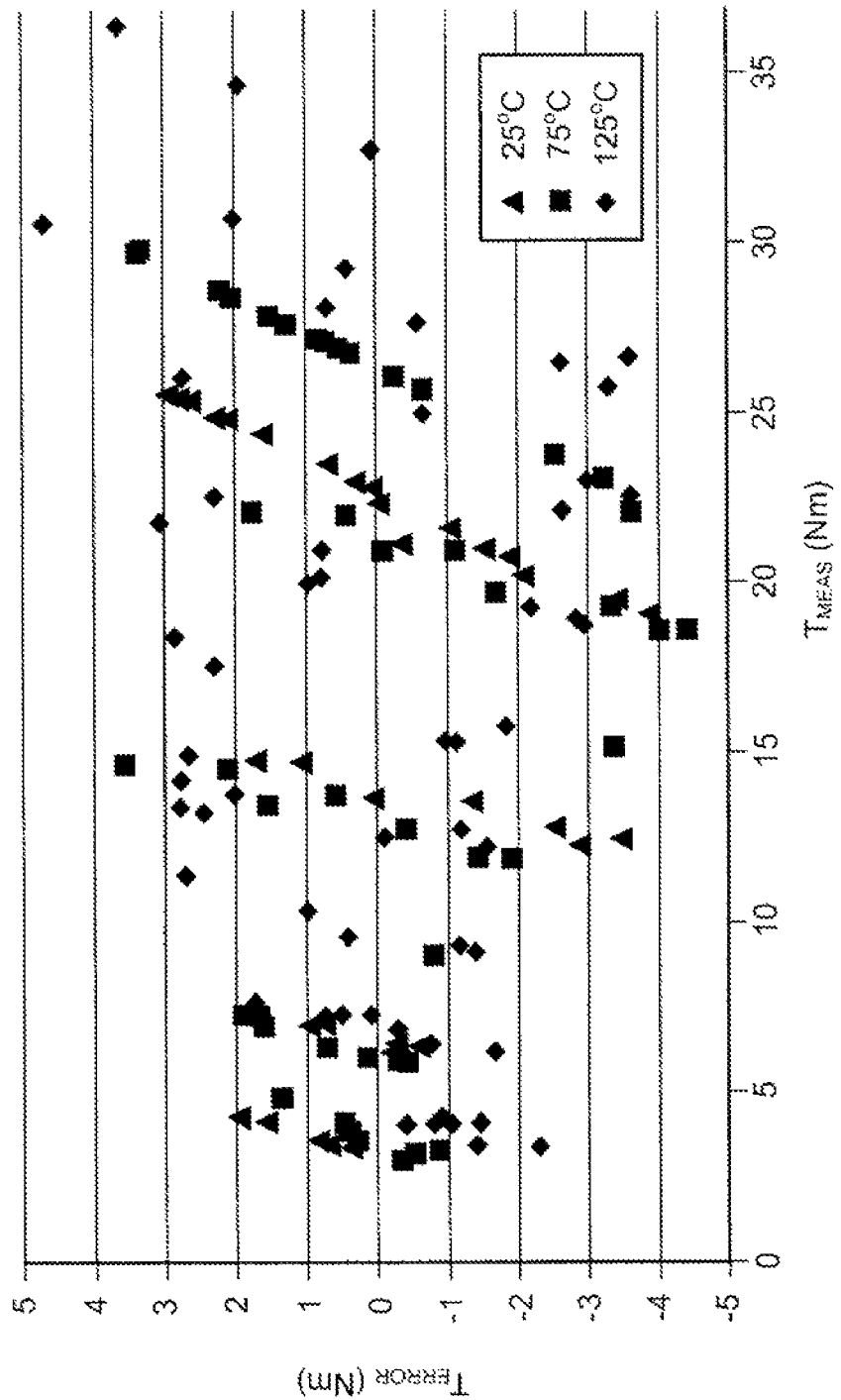
FIG. 5 is a graph illustrating exemplary data points of crankshaft torque versus torque error for the multiple operating temperatures achieved using the generator torque control.

Referring now to FIG. 5, exemplary data points illustrate the torque error ($T_{ERROR}$) achieved. More specitfoally, $T_{ERROR}$ is defined as the difference between the measured generator torque $T_{MEAS}$ and the best-fit curve of FIG. 3. As can be seen, the majority of the exemplary data points lie within +/−4 Nm. This is a significant improvement over the +/−20 Nm error that is achieved using the traditional method of using a constant value for estimated torque.

Figure 6:
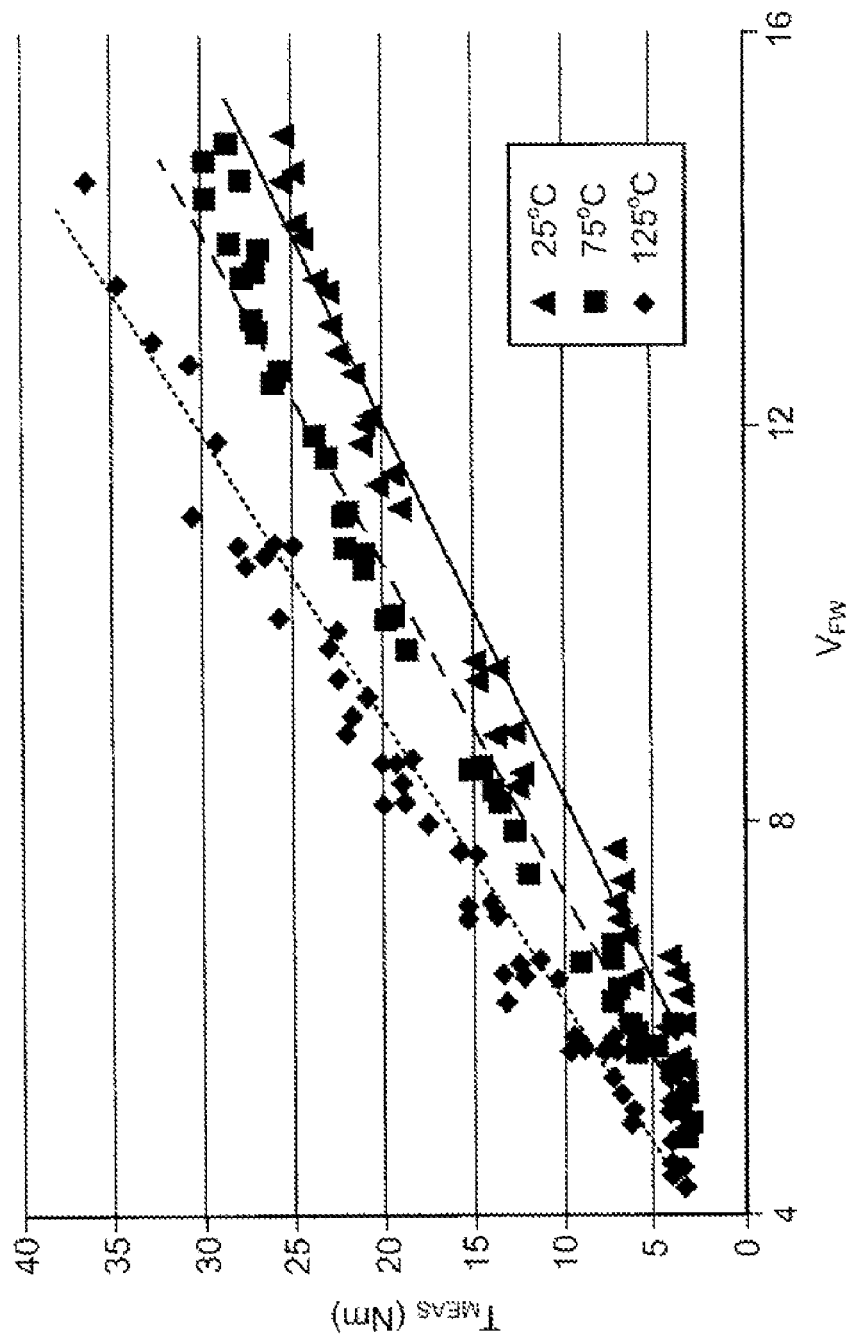
FIG. 6 is a graph illustrating exemplary data points of field winding voltage versus crankshaft torque for multiple operating temperatures.

Referring now to FIG. 6, an alternative generator torque estimation system determines $T_{GENCORR}$ based on a field winding voltage ($V_{FW}$), engine speed (RPM) and engine temperature ($TEMP_{ENG}$). $V_{FW}$ is calculated based on $DC_{FC}$ and a system voltage ($V_{SYS}$). $V_{SYS}$ is measured by the control module 38. Exemplary data points were collected for $V_{FW}$ versus $T_{MEAS}$ (i.e., the measured torque load on the crankshaft to drive the generator) at engine idle (e.g., 1800 generator RPM) for multiple ambient temperatures (e.g., 25° C., 75° C. and 125° C.). Best fit curves are provided for each temperature data set. A multi-dimensional look-up table is implemented to determine the best fit value of $T_{GEN}$ based on engine RPM and $V_{FW}$. As similarly described above, the torque correction look-up table is derived based on the temperature data sets and best fit curves. $T_{CORR}$ is determined from the look-up table based on $TEMP_{ENG}$. $TEMP_{ENG}$ is determined based on the coolant temperature, the oil temperature and/or the ambient temperature. $T_{GENCORR}$ is determined based on $T_{GEN}$ and $T_{CORR}$.

Figure 7:
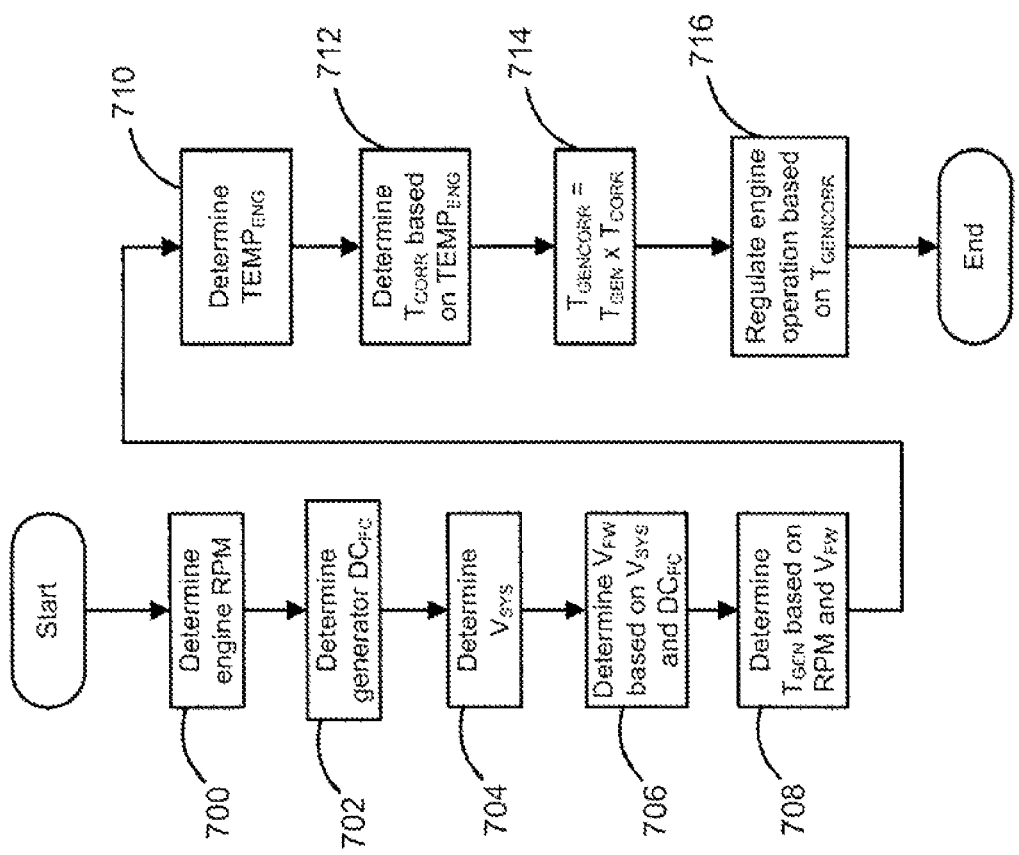
FIG. 7 is a flowchart illustrating exemplary steps executed by an alternative generator torque control according to the present invention.

Referring now to FIG. 7, exemplary steps executed by a generator torque control will be discussed in detail. In step 700, control determines the engine RPM and in step 702, control determines $DC_{FC}$. Control determines $V_{SYS}$ in step 704 and determines $V_{FW}$ based on $V_{SYS}$ and $DC_{FC}$ in step 706. $T_{GEN}$ based on RPM and $V_{FW}$ in step 708. Control determines $TEMP_{ENG}$ in step 710. Control determines $T_{CORR}$ based on $TEMP_{GEN}$ in step 712. In step 714, control calculates $T_{GENCORR}$ as the product of $T_{GEN}$ and $T_{CORR}$. In step 716, control regulates operation of the engine based on $T_{GENCORR}$.

Figure 8:
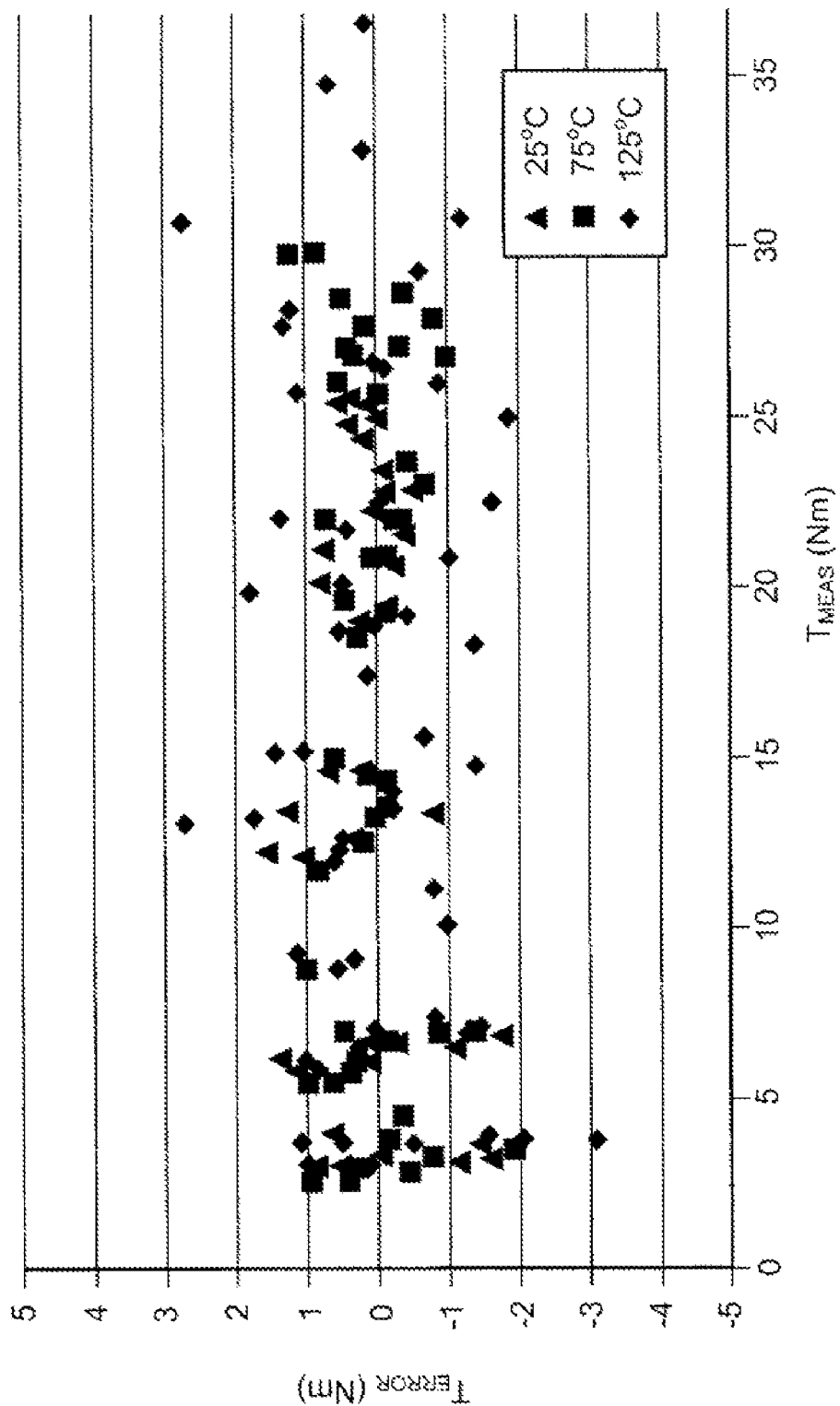
FIG. 8 is a graph illustrating exemplary data points of crankshaft torque versus torque error for the multiple operating temperatures achieved using the alternative generator torque control.

Referring now to FIG. 8, exemplary data points illustrate $T_{ERROR}$ achieved. Again, $T_{ERROR}$ is defined as the difference between the estimated $T_{MEAS}$ and the best-fit curve of FIG. 6. As can be seen, the majority of the exemplary data points lie within +/−2Nm. This is a significant improvement over the +/−20Nm error that is achieved using the traditional method of estimating generator torque as a constant value.

The present invention provides still another alternative generator torque estimation system. More specifically, a generator current sensor 60 (see FIG. 1) is provided and is responsive to a generator current ($I_{GEN}$). A curve fit of generator torque is determined based on engine RPM, $V_{SYS}$ and $I_{GEN}$ to provide the following relationships:

$$T_{GEN} = (k_a + k_b \cdot RPM + k_c \cdot RPM^2) + ((k_d + k_e \cdot I_{GEN} + k_f \cdot I_{GEN}^2)(1 + k_g \cdot V_{SYS})/RPM)$$

where $k_a$ through $k_g$ are calibration constants are obtained by performing a least-squares curve fit against the test data. This relationship is independent of temperature because the losses associated with speed and generator current move in opposite directions versus temperature and therefore, the temperature effect is minimal.

Figure 9:
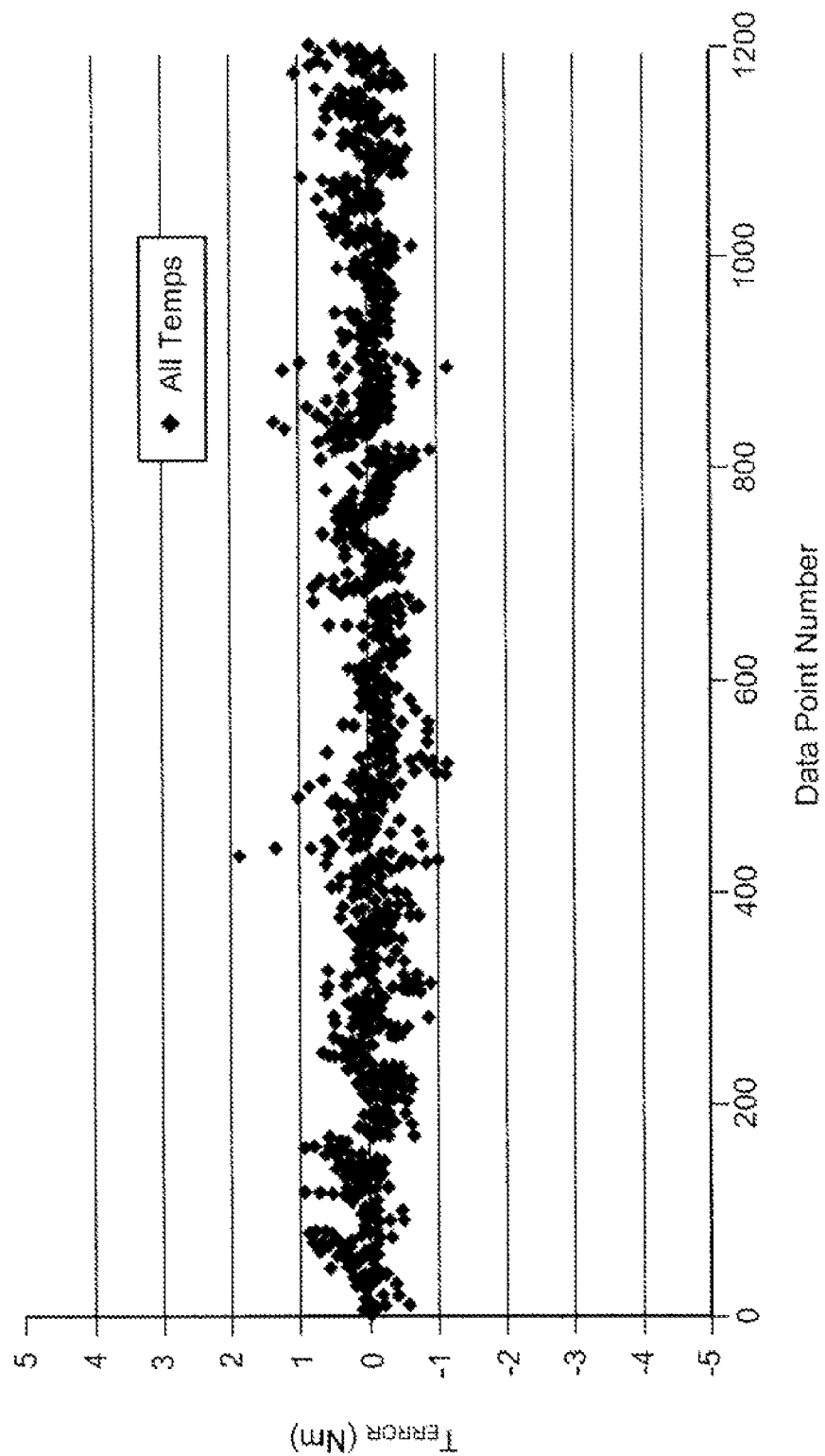
FIG. 10 is a graph illustrating exemplary data points of torque error for multiple samples achieved using the alternative generator torque controls and FIG. 9 is a flowchart illustrating exemplary steps executed by another alternative generator torque control according to the present invention.

Referring now to FIG. 9, $T_{ERROR}$ is shown for multiple data points taken across generator RPM, temperature and load ranges. For example, $T_{ERROR}$ was determined from a data set with generator speed varying from 1400 to 10000 RPM (i.e., 420 to 3000 engine RPM), ambient temperature varying from 25 to 125° C., $I_{GEN}$ varying from 10A to 90A and $V_{SYS}$ varying from 12.4V to 15.5V. As can be seen, $T_{ERROR}$ is reduced and is within a range of approximately +/−1Nm.

Figure 10:
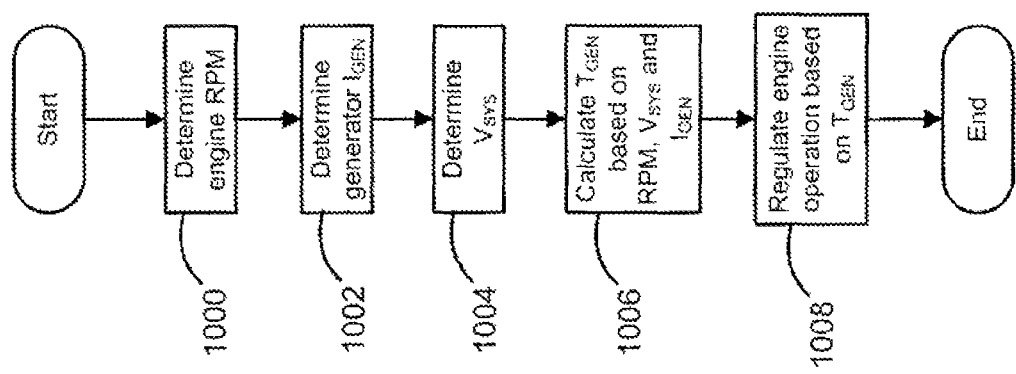

Referring now to FIG. 10, the steps executed by the second alternative generator torque estimation system will be described in detail. In steps 1000, 1002 and 1004, control determines RPM, $I_{GEN}$ and $V_{SYS}$ respectively. In step 1006 control calculates $T_{GEN}$ based on RPM, $I_{GEN}$ and $V_{SYS}$ by processing the above-described equation. Control regulates engine operation based on $T_{GEN}$ in step 1008.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for an engine that drives a generator, comprising:
   an engine temperature sensor that generates an engine temperature signal; and
   a control module that determines a generator torque based on an engine speed and a generator characteristic, that determines a torque correction factor based on said engine temperature signal and that determines a corrected generator torque based on said generator torque and said torque correction factor.

2. The engine control system of claim 1 wherein said generator characteristic includes a duty cycle of a field winding of said generator.

3. The engine control system of claim 1 wherein said generator characteristic includes a field winding voltage of said generator.

4. The engine control system of claim 3 wherein said field winding voltage is determined based on a system voltage and a field winding duty cycle of said generator.

5. The engine control system of claim 1 wherein said control module regulates operation of said engine based on said corrected generator torque.

6. A method of regulating operation of an engine operation that drives a generator based on a generator torque, comprising:
   generating an engine temperature signal, an engine speed signal and a generator characteristic signal;
   determining a generator torque based on said engine speed signal and said generator characteristic signal;
   determining a torque correction factor based on said engine temperature signal; and
   calculating a corrected generator torque based on said generator torque and said torque correction factor.

7. The method of claim 6 wherein said generator characteristic signal is based on a duty cycle of a field winding of said generator.

8. The method of claim 6 wherein said generator characteristic signal is based on a field winding voltage of said generator.

9. The method of claim 8 wherein said field winding voltage is determined based on a system voltage and a field winding duty cycle of said generator.

10. The method of claim 6 further comprising regulating operation of said engine based on said corrected generator torque.

* * * * *